United States Patent
Ashwood-Smith et al.

(10) Patent No.: US 10,623,996 B2
(45) Date of Patent: Apr. 14, 2020

(54) GTP TUNNELS FOR THE SUPPORT OF ANCHORLESS BACKHAUL

(71) Applicants: Peter Ashwood-Smith, Gatineau (CA); Mehdi Arashmid Akhavain Mohammadi, Ottawa (CA)

(72) Inventors: Peter Ashwood-Smith, Gatineau (CA); Mehdi Arashmid Akhavain Mohammadi, Ottawa (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/871,294

(22) Filed: Jan. 15, 2018

(65) Prior Publication Data
US 2019/0223053 A1    Jul. 18, 2019

(51) Int. Cl.
| | |
|---|---|
| *H04W 28/10* | (2009.01) |
| *H04W 76/10* | (2018.01) |
| *H04W 88/16* | (2009.01) |
| *H04W 76/22* | (2018.01) |
| *H04W 84/04* | (2009.01) |
| *H04W 88/10* | (2009.01) |

(52) U.S. Cl.
CPC .......... *H04W 28/10* (2013.01); *H04W 76/10* (2018.02); *H04W 76/22* (2018.02); *H04W 84/042* (2013.01); *H04W 88/10* (2013.01); *H04W 88/16* (2013.01)

(58) Field of Classification Search
CPC ..... H04W 28/10; H04W 76/10; H04W 84/02; H04W 88/10; H04W 88/16
See application file for complete search history.

(56) References Cited

U.S. PATENT DOCUMENTS

| | | | | |
|---|---|---|---|---|
| 6,993,039 B2 * | 1/2006 | Borella | ............... | H04L 12/4633 370/401 |
| 7,801,021 B1 * | 9/2010 | Triantafillis | ........ | H04L 12/4633 370/216 |
| 8,532,107 B1 * | 9/2013 | Ghosh | ..................... | H04L 45/00 370/392 |
| 8,798,047 B1 * | 8/2014 | Wadekar | ................. | H04L 12/56 370/389 |
| 8,804,732 B1 * | 8/2014 | Hepting | ................ | H04W 76/11 370/392 |
| 2014/0086253 A1 * | 3/2014 | Yong | ................... | H04L 12/4633 370/395.53 |

(Continued)

FOREIGN PATENT DOCUMENTS

| | | |
|---|---|---|
| CN | 105794264 A | 7/2016 |
| EP | 2876924 A1 | 5/2015 |

(Continued)

OTHER PUBLICATIONS

3GPP TSG CT4 Meeting #81, C4-176225, Nokia et al. GTP-C tunnel per UE over the N26 interface, Reno, US; Nov. 27-Dec. 1, 2017, 3 pages.

*Primary Examiner* — Afsar M Qureshi

(57) ABSTRACT

A method in a mobile network including a first node configured to receive packets through a point-to-point tunnel from a second node. The method comprises a third node performing steps of: accessing tunnel information identifying the point-to-point tunnel; encapsulating a packet using a tunnel header containing the accessed tunnel information; and sending the encapsulated packet to the first node.

18 Claims, 13 Drawing Sheets

(56) References Cited

U.S. PATENT DOCUMENTS

| | | | |
|---|---|---|---|
| 2014/0247830 A1* | 9/2014 | Kolbe | H04L 49/354 370/392 |
| 2015/0009995 A1* | 1/2015 | Gross, IV | H04L 45/74 370/392 |
| 2015/0189563 A1 | 7/2015 | Chan et al. | |
| 2018/0192471 A1* | 7/2018 | Li | H04W 72/0493 |

FOREIGN PATENT DOCUMENTS

| | | | | |
|---|---|---|---|---|
| EP | 2777219 B1 * | 8/2016 | | H04L 49/354 |
| WO | 2017218620 A1 | 12/2017 | | |

* cited by examiner

GTP TUNNELS FOR THE SUPPORT OF ANCHORLESS BACKHAUL

FIELD OF THE INVENTION

The present invention pertains to the field of Communication networks, and in particular to GTP Tunnels for the support of Anchorless Backhaul.

BACKGROUND

Mobile Back-Haul networks typically depend on an anchor node, such as either one or both of a Serving Gateway (SGW) and a Packet Data Network (PDN) Gateway (PGW) to provide device administration services (such as traffic monitoring, policy enforcement, and generating reports for customer billing) pertaining to mobile electronic devices.

So-called anchorless networks have been proposed, but these proposals do not provide any means by which the device administration services may be maintained.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method in a mobile network including a first node configured to receive packets through a point-to-point tunnel from a second node. The method comprises a third node performing steps of: accessing tunnel information identifying the point-to-point tunnel; encapsulating a packet using a tunnel header containing the accessed tunnel information; and sending the encapsulated packet to the first node.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

In the following description, features of the present invention are described by way of example embodiments. For convenience of description, these embodiments make use of features and terminology known from 4G and 5G networks as defined by the Third Generation Partnership Project (3GPP). However, it shall be understood that the present invention is not limited to such networks. Rather, methods and systems in accordance with the present invention may be implemented in any network in which packets destined for an electronic device are routed through a tunnel to an Access Point connected to the electronic device. Similarly, for convenience of description, the example embodiments described herein make use of features of Generic Protocol Radio System (GPRS) Tunnel Protocol (GTP) tunnels established between a pair of endpoint nodes in the network. However, it shall be understood that the present invention is not limited to GTP tunnels. Rather, methods and systems in accordance with the present invention may be implemented using any tunneling protocol.

Figure 1:
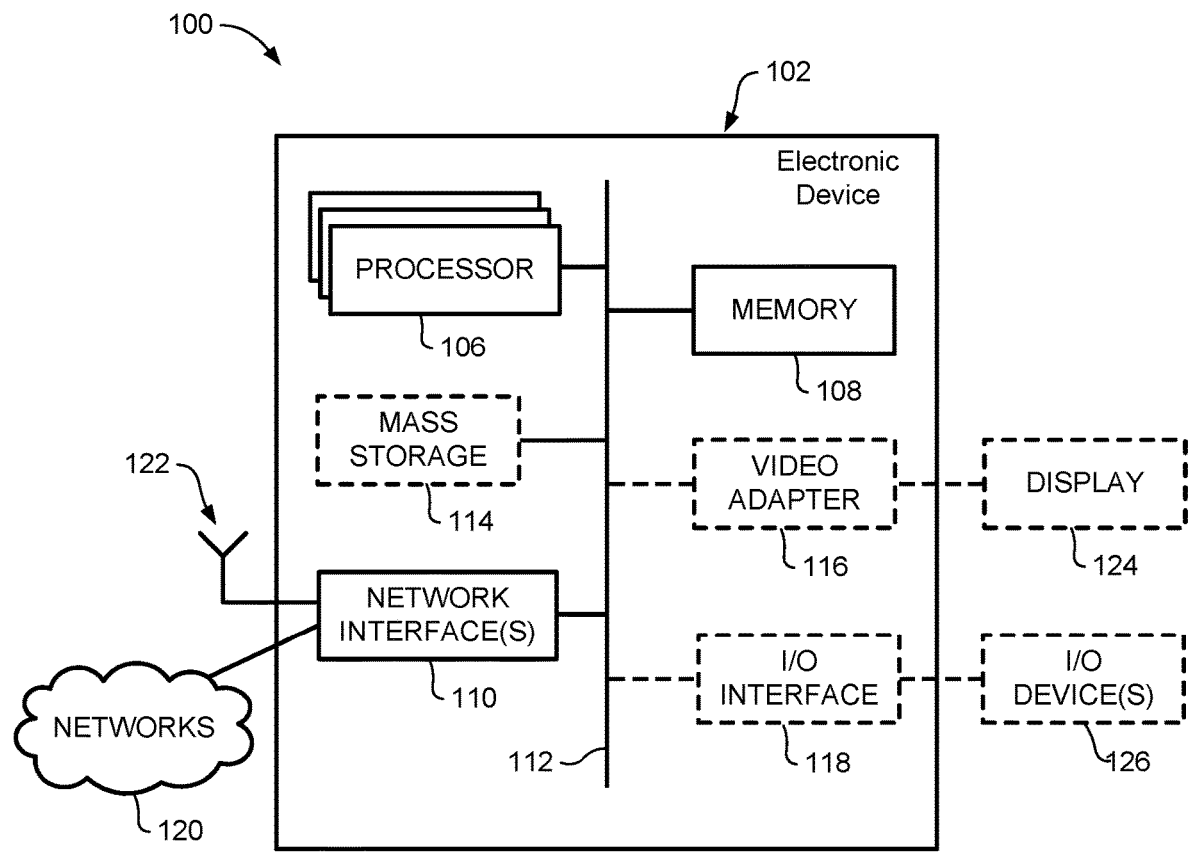
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a PDN Gateway (PGW) or a serving gateway (SGW) or various other nodes or functions within an evolved packet core (EPC) network. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
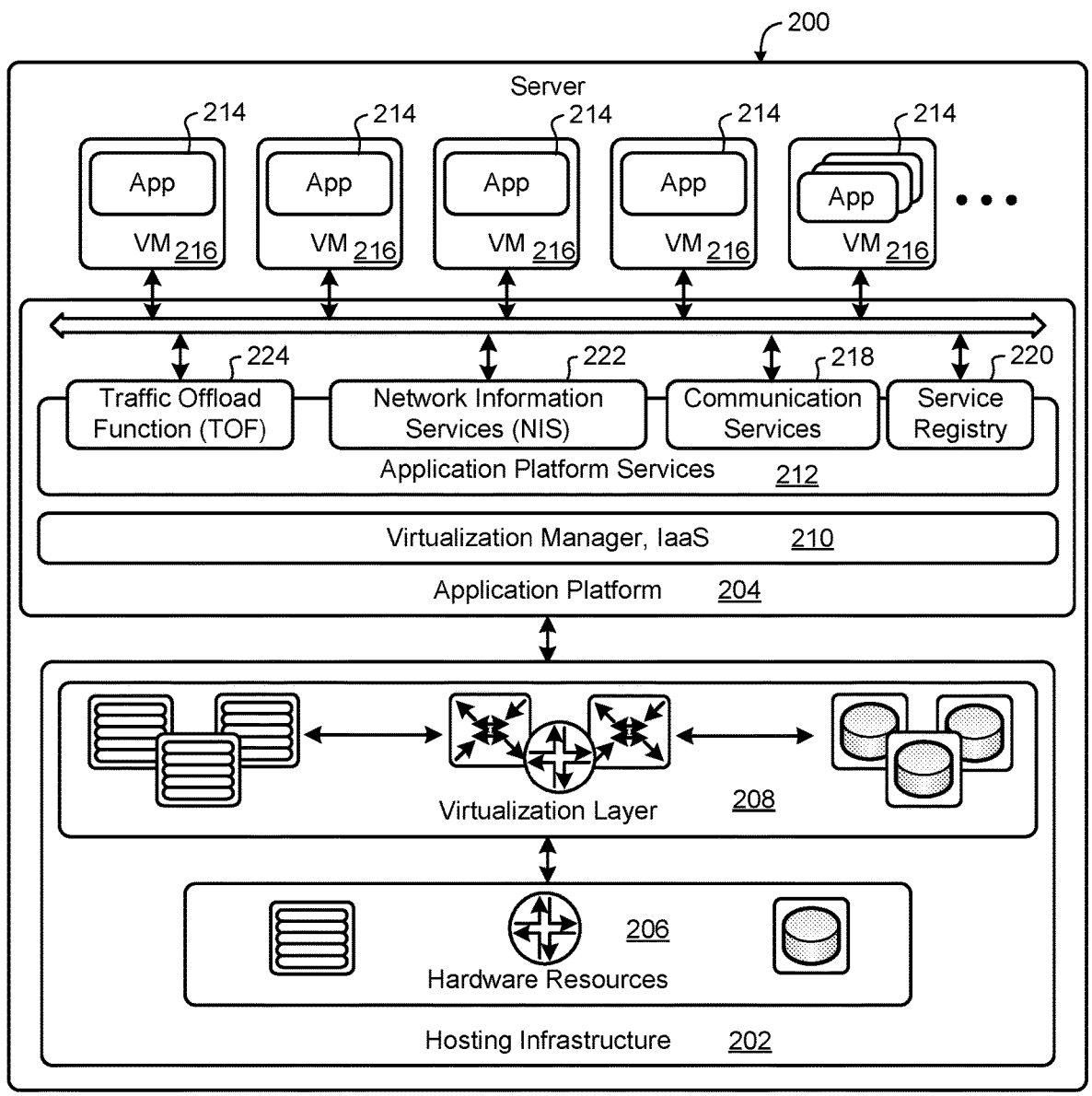
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middle-ware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3A:
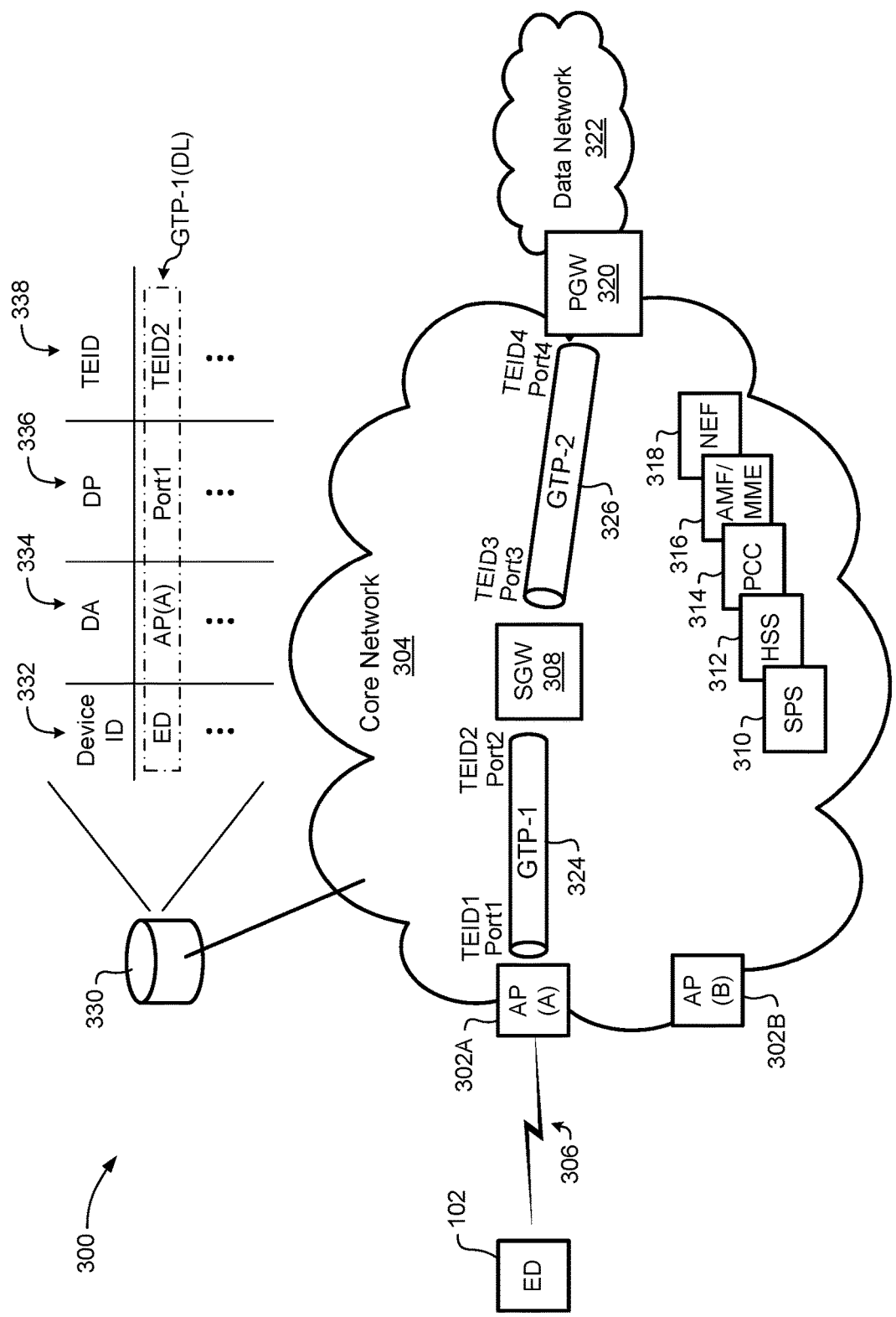
FIGS. 3A-3C are block diagrams illustrating elements of a mobile network in which embodiments of the present invention may be deployed.

FIG. 3A is a block diagram schematically illustrating an architecture of a representative network 300 usable in embodiments of the present invention. In some embodiments, the network 300 may be physically implemented as one or more computers, storage devices and routers (any or all of which may be constructed in accordance with the system 100 described above with reference to FIG. 1) interconnected together to form a Wide Area Network, and executing suitable software to perform its intended functions. In other embodiments, some or all of the elements of the network 300 may be virtualized entities executing in a server environment such as described above with reference to FIG. 2. For this reason, a figure showing the physical network hardware is not included in this specification. Rather, the block diagram of FIG. 3 shows a representative functional architecture of a network 300, it being understood that this functional architecture may be implemented using any suitable combination of hardware and software.

In the example of FIG. 3A, the network 300 comprises a pair of access points 302A, 302B connected to a core network 304 which is configured to provide communications and connectivity services to electronic devices 102 connected to the access points 302A, 302B via links 306. In some embodiments, the links 306 may include wireless links between the ED 102 and an antenna 122 (not shown in FIG. 3) connected to network interfaces 110 of the AP 302. In embodiments deployed in a Centralized Radio Access network (CRAN) environment, the links 306 may encompass both wireless links and fronthaul connections to the access point 302. In the 4G or 5G networking environments, the access points 302A, 302B may be provided as eNodeB or gNB nodes, and the core network 304 may be an Evolved Packet Core (EPC) network providing network functions such as a Serving Gateway (SGW) 308, Service Provider Server (SPS) 310, a Home Subscriber Server (HSS) 312, a Policy and Charging Control (PCC) function 314, an Access and Mobility Management Function (AMF) 316 or its predecessor Mobility Management Entity (MME), a Network Exposure Function (NEF) 318 and a PDN Gateway (PGW) 320. In some embodiments, the PDN Gateway 320 may be configured to provide connectivity to a data network 322 (such as the Internet, for example). It will be appreciated that in typical 4G or 5G networking environment, there may be more than one each of the SGW 308, SPS 310, HSS 312, PCC 314, AMF/MME 316, NEF 318 and PGW 320. User-Plane packets to and from the ED 102 may be transported through a first GPRS Tunnel Protocol (GTP) tunnel (GTP-1) 324 extending between an Access Point 302 serving the ED 102 and the SGW 308, and a second GTP tunnel (GTP-3) 326 extending between the SGW 308 and the PGW 320. In some embodiments, a respective tunnel 324 extending between an Access Point 302 and the SGW 308 is established for each link 306 between the AP 302 and EDs 102 located within the coverage area of the AP. Similarly, in some embodiments a respective tunnel 326 extending between the SGW 308 and the PGW 320 is established for each tunnel 324 between the AP 302 and the SGW 308. In other embodiments a tunnel 326 extending between the SGW 308 and the PGW 320 may be used to convey traffic associated with two or more tunnels 324 between the SGW 308 and one or more APs 302.

Figure 3B:
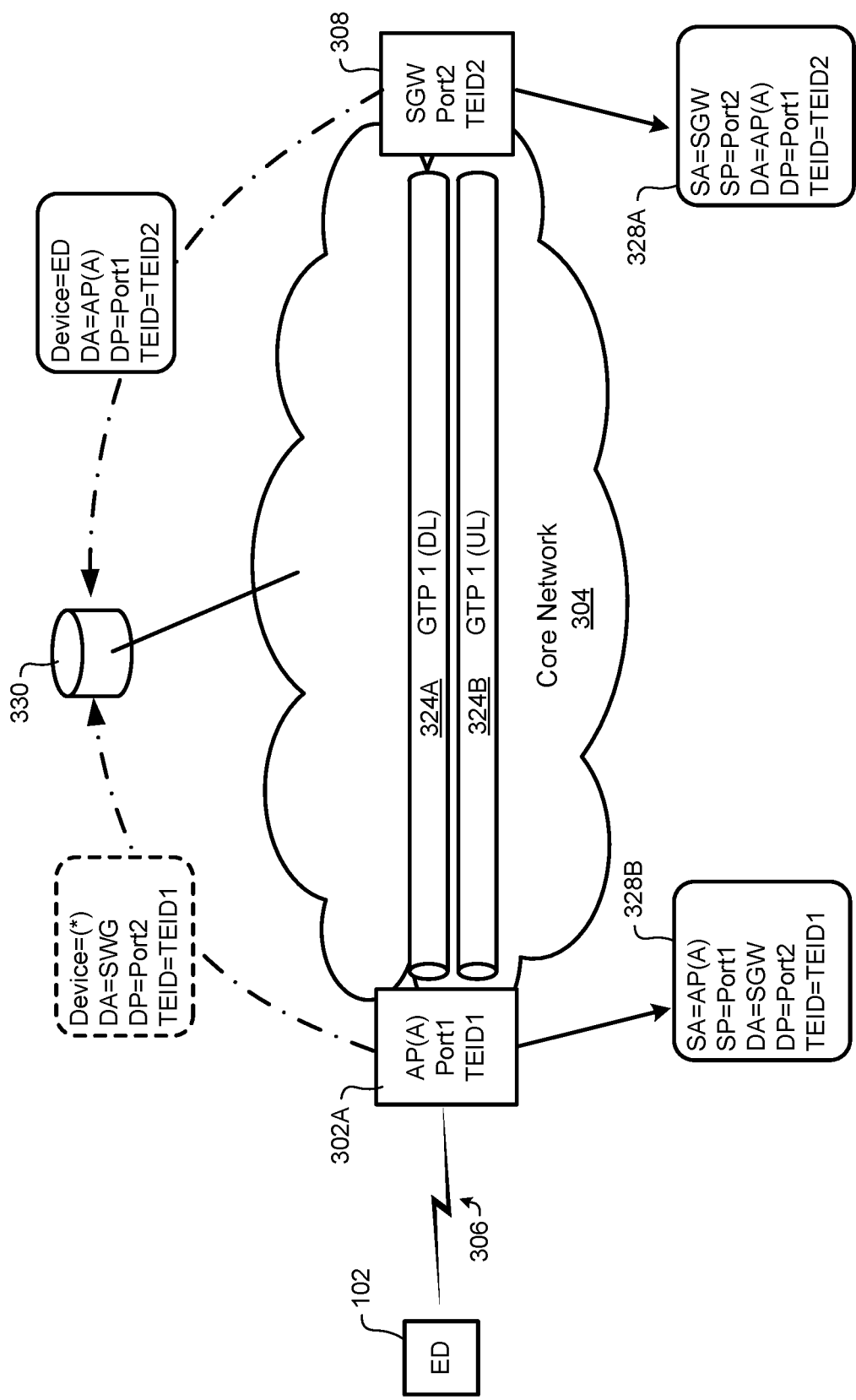

Tunnels GTP-1 324 and GTP-2 326 may be point-to-point tunnels, and may be identified by respective Tunnel Endpoint Identifiers (TEIDs), User Data Plane (UDP) Port Numbers and IP addresses associated with the nodes serving as the tunnel endpoints. For example, FIG. 3B illustrates, in greater detail, tunnel GTP-1 324 which extends between AP(A) 302A and SGW 308. As may be seen in FIG. 3B, GTP-1 324 comprises a pair of unidirectional tunnels GTP-1(DL) 324A and GTP-1(UL) 324B. GTP-1(DL) 324A is used to convey Downlink packets from SGW 308 to AP(A) 302A. Conversely, GTP-1(UL) 324B is used to convey Uplink packets from AP(A) 302A to SGW 308.

Each of the two endpoint nodes of GTP-1 324 has a respective IP address, which may be used for routing Uplink and Downlink packet traffic through the UL and DL tunnels. During establishment of GTP-1 324, AP(A) 302A may allocate a respective Tunnel Endpoint Identifier (=TEID 1) and a UDP Port Number (=Port 1) to the UL and DL tunnels, while SGW 308 may allocate a respective Tunnel Endpoint Identifier (=TEID 2) and a UDP Port Number (=Port 2) to the tunnels. In some embodiments, a predetermined UDP port number (such as "2152") may be used for GTP tunnels established within a network or network domain. In such cases, both Port1 and Port 2 will correspond with the predetermined UDP port number, and so will have the same value. In other embodiments, a respective port number for each endpoint node may chosen during tunnel establishment. In such a case, each endpoint node may use the same or a different port number, which may or may not be "2152". Typically, at least the TEIDs will be shared between the two endpoint nodes during tunnel establishment, so that each node can identify and properly handle packets received through the tunnel. For example, a DownLink (DL) packet destined for ED 102 may be sent by SGW 308 to the AP(A) 302A through the tunnel GTP-1(DL) 324A, encapsulated with a tunnel header 328A that includes: the IP address of the SGW 308 as the source address (SA); the UDP port number used by the SGW 308 as the source port (SP); the IP address of the AP(A) 302A as the destination address (DA); the port number used by the AP(A) 302A as the destination port (DP), and the TEID (=TEID 2) assigned to the tunnel by the SGW 308 during tunnel establishment. Upon receipt of the DL packet, the AP(A) 302A can read the Source Port Number and Source Address from the header 328A to verify that the DL packet was sent from the SGW 308, and compare the TEID field of the header 328A to the information previously provided to it by the SGW 308 during tunnel establishment to verify that the TEID of the packet was issued by the SGW 308. Based on these steps, the AP(A) 302A can verify whether or not the received DL packet was indeed sent through the tunnel GTP-1 by the SGW 308. The AP(A) may also use the TEID (=TEID 2) of the tunnel header 328A to identify the link 306 through which the DL packet should be forwarded to the ED 102.

Similarly, an UpLink UL) packet destined for Data Network 322 may be sent by AP(A) 302A to the SGW 308 through the tunnel GTP-1(UL) 324B, encapsulated with a tunnel header 328B that includes: the IP address of the AP(A) 302A as the source address (SA); the UDP port number used by the AP(A) 302A as the source port (SP); the IP address of the SGW 308 as the destination address (DA); the port number used by the SGW 308 as the destination port (DP), and the TEID (=TEID 1) assigned by the AP(A) 302A during tunnel establishment. Upon receipt of the UL packet, the SGW 308 can read the Source Port Number and Source Address from the header to verify that the UL packet was sent from the AP(A) 302A, and compare the TEID field of the header to the information previously provided to it by the AP(A) 302A during tunnel establishment to verify that the TEID of the packet was issued by the AP(A) 302A. Based on these steps, the SGW 308 can verify whether or not the received UL packet was indeed sent through the tunnel GTP-1 by the AP(A) 302A. The SGW 308 may also use the TEID (=TEID 1) of the tunnel header 328B to identify the tunnel GTP-2 326 through which the UL packet should be forwarded to the PGW 320.

In accordance with aspects of the present invention, tunnel information pertaining to a tunnel 324 extending between an Access Point 302 and the SGW 308 is exposed to other entities in the network.

In some embodiments, each node (eg. an AP 302 or an SGW 308) may maintain its own listing of tunnel information, which may pertain only to those tunnels for which the involved node operates as an endpoint. In such cases, the node may permit other nodes to access to its listing of tunnel information. For example, the node may offer a tunnel information update service to which other nodes may subscribe. In another example, the node may respond to requests for information from other nodes. Other methods by which a node may expose some or all of its tunnel information listing to other nodes of the network 300 will be (or will become) apparent to those of ordinary skill in the art.

Figure 3C:
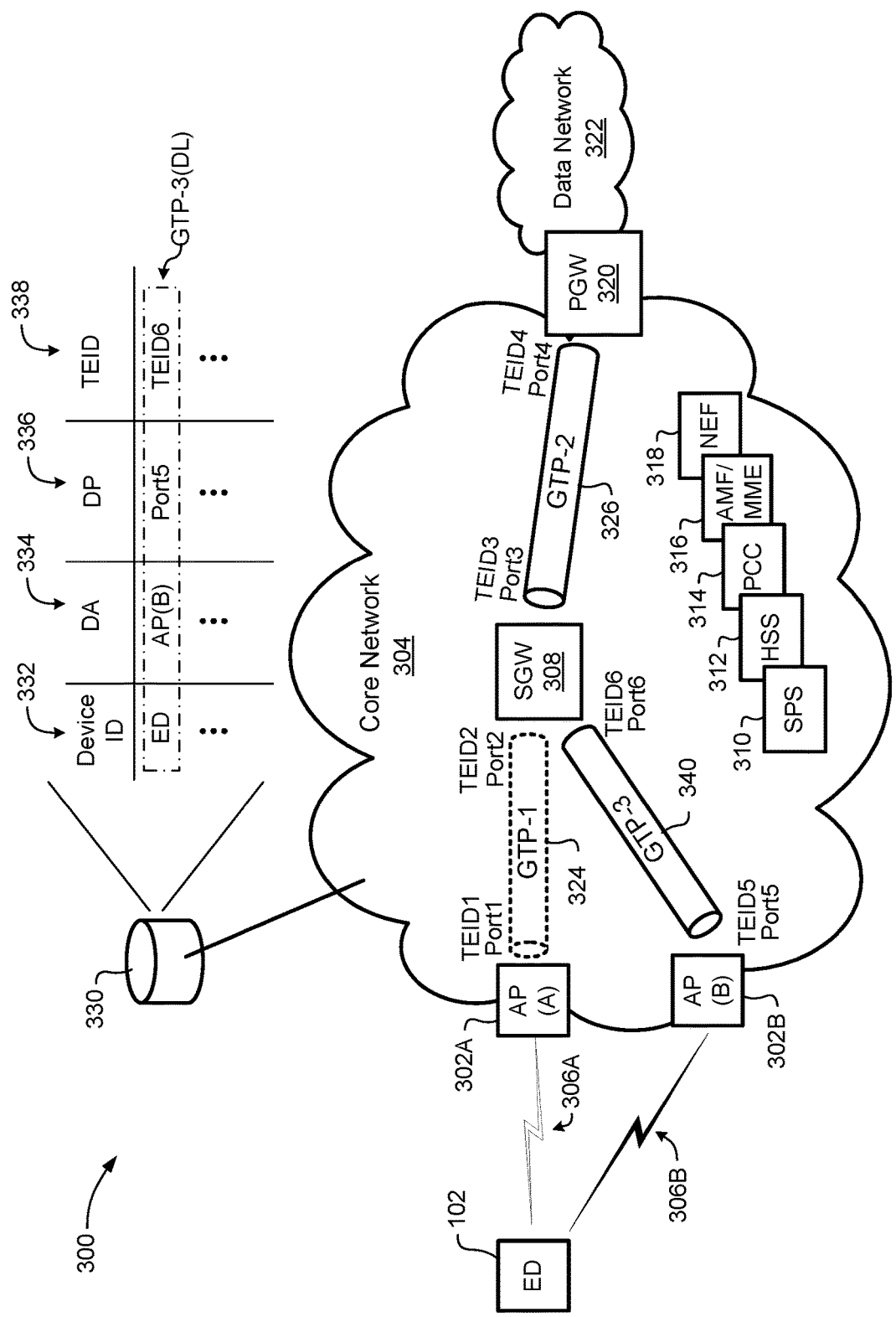

FIGS. 3A-3C illustrate a specific example embodiment in which a central repository 330 of tunnel information is maintained by any suitable network management function, for example, and may be accessed by other nodes in the network. In the example, of FIGS. 3A-3C, the central repository 330 stores tunnel information comprising, for each tunnel 324: a device identifier 332; a destination address 334; a destination port 336 and a source TEID 338. The device identifier 332 may identify an endpoint of an end-to-end traffic flow associated with the tunnel. For example, GTP-1(DL) 324A is associated with Downlink traffic flows to the ED 102, which is an endpoint of an end-to-end traffic flow between the ED 102 and an application server (not shown) accessible through the Data Network 322. Accordingly, the device identifier 332 may contain an identifier (such as, for example, an IP address) of the ED 102. The destination address 334, destination port 336 and the source TEID 338 comprise data that is inserted into packets being sent through the tunnel. For example, as described above with reference to FIG. 3B, DL packets destined for the ED 102 are encapsulated by the SGW 308 with a header 328A that includes a destination address and destination port of the AP(A) 302A, and a TEID assigned by the SGW 308. Accordingly, these values may be provided to the central repository 330 (for example by either the AP(A) 302A or the SGW 308) and exposed to other entities in the network 300.

Figure 4:
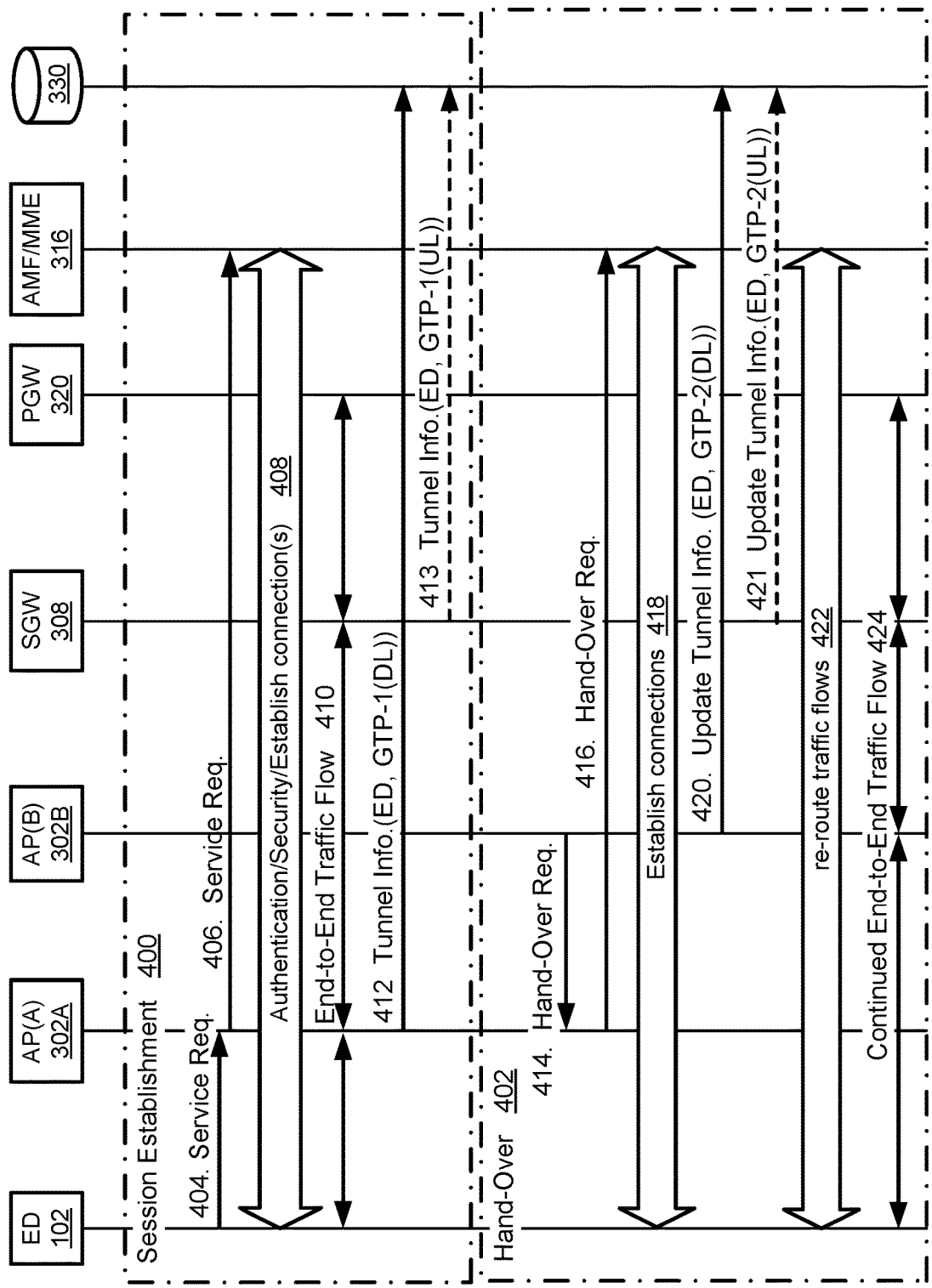
FIG. 4 is a message flow diagram illustrating example session establishment and Hand-Over procedures of a type that may be implemented in the network of FIGS. 3A and 3B.

FIG. 4 is a message flow diagram illustrating example session establishment 400 and Hand-Over 402 procedures of a type that may be implemented in the network 300 of FIG. 3A. FIG. 3C illustrates a state of the network 300 after completion of the Hand-Over procedure 402.

Referring to FIG. 4 and FIG. 3A, session establishment 400 typically begins with a service request 404 that is sent from the mobile electronic device (ED) 102 to an initial Access Point 302A. Upon receipt of the service request 404, the Access Point 302A may forward a corresponding service request (at 406) to the AMF/MME 316. Following receipt of the service request, the AMF/MME 316 may interact (at 408) with the HSS 312 to authenticate the service request and, upon successful authentication, with the SGW 308 and PGW 320 to establish connections (such as, for example GTP tunnel 324) and associations needed to support the requested service.

Once connections and associations needed to support the requested service have been established, end-to-end traffic flows associated with the service session can begin (at 410). At the same time, the Access Point 302A (or the SWG 308) may forward to the central repository 330 (at 412) tunnel information pertaining to the Downlink GTP tunnel (GTP-1(DL)) 324A established between the initial AP 302A and the SGW 308. As noted above, the tunnel information sent to the Central Repository 330 by the SGW 308 may include a device identifier 332 of the ED 102, a destination Address 334 and Destination port 336 of the initial AP 302A, and the source TEID 338 allocated by the SGW 308.

Optionally, the initial AP 302A (or the SWG 308) may also forward to the central repository 330 (at 413) tunnel information pertaining to the Uplink GTP tunnel (GTP-1(UL)) 324B established between the initial AP 302A and the SGW 308. As noted above, the tunnel information sent to the Central Repository 330 by the initial AP 302A may include a device identifier 332 of an Application Server accessible through the Data network 322, a destination Address 334 and Destination port 336 of the SGW 308, and the source TEID 336 allocated by the initial AP 302A. In some embodiments, the device identifier field 332 of the Uplink tunnel information may be a wildcard value, rather than an address of a particular Application Server. In operation, the use of the wildcard value would mean that all Uplink traffic received by the initial AP 302A (from all EDs 102 within its coverage area) is forwarded through the GTP-1 324 to the SGW 308.

During the course of the communications session, the ED 102 may move from a coverage area of the initial Access Point 302A and enter a coverage area of a new Access Point, such as access point 302B. Referring to FIG. 4 and FIG. 3C, the new access point 302B may initiate the Hand-Over procedure 402 by sending a Hand-Over request 414 to the initial Access Point 302A, which may respond to the Hand-Over request 414 by sending a corresponding Hand-Over request 416 to the AMF/MME 316. Following receipt of the Hand-Over request 416, the AMF/MME 316 may interact with the ED 102, the involved access points 302A and 302B and the SGW 308 to trigger establishment (at 418) of new connections with the new access point 302B. These new connections may include new GTP tunnel (GTP-3) 340 between the SGW 308 and the new AP 302B. Once the new GTP tunnel GTP-3 340 has been set up, the new access point 302B (or the SGW 308) may send (at 420) an update message to the central repository 330 to update the tunnel information pertaining to the ED 102. In the example of FIG. 3C, this updated tunnel information may include the device identifier 332 of the ED 102, a destination Address 334 and Destination port 336 of the new AP 302B, and the source TEID 338 allocated by the SGW 308.

Optionally, the new AP 302B (or the SGW 308) may also forward to the central repository 330 (at 421) tunnel information pertaining to the corresponding Uplink GTP tunnel (GTP-3(UL)) between the new AP 302B and the SGW 308. The tunnel information sent to the Central Repository 330 by the new AP 302B may include a device identifier 332 of an Application Server accessible through the Data network 322 (or a Wildcard value), a destination Address 334 and Destination port 336 of the SGW 308, and the source TEID 336 allocated by the new AP 302B.

The AMF/MME 316 may further interact with the ED 102, the involved access points 302A and 302B and the SGW 308 to reroute traffic (at 422) to the ED 102 via the new tunnel GTP-3 338 and the new access point 302B. Upon completion of the foregoing steps, end-to-end traffic flows to and from the ED 102 can continue (at 424), but in this case are being routed through GTP-3 340 and the new access point 302B.

During the Hand-Over procedure 402, there may be a delay between the time at which the link 306A between the ED 102 and the initial AP 302A has been released, and the time at which the SGW 308 begins redirecting traffic to the ED 102 through the new tunnel GTP-3 340. During this interval, DL packets destined for the ED 102 may arrive at the initial AP 302A. However, because the link 306A between the ED 102 and the initial AP 302A has been released, the initial AP 302A is unable to forward these "late-arriving" DL packets directly to the ED 102. In conventional systems, the initial AP 302A would either discard these DL packets, redirect them back to the SGW 308, or establish a connection (which may include negotiating another GTP tunnel) to the new AP 302B through which the DL packets can be forwarded.

Figure 5:
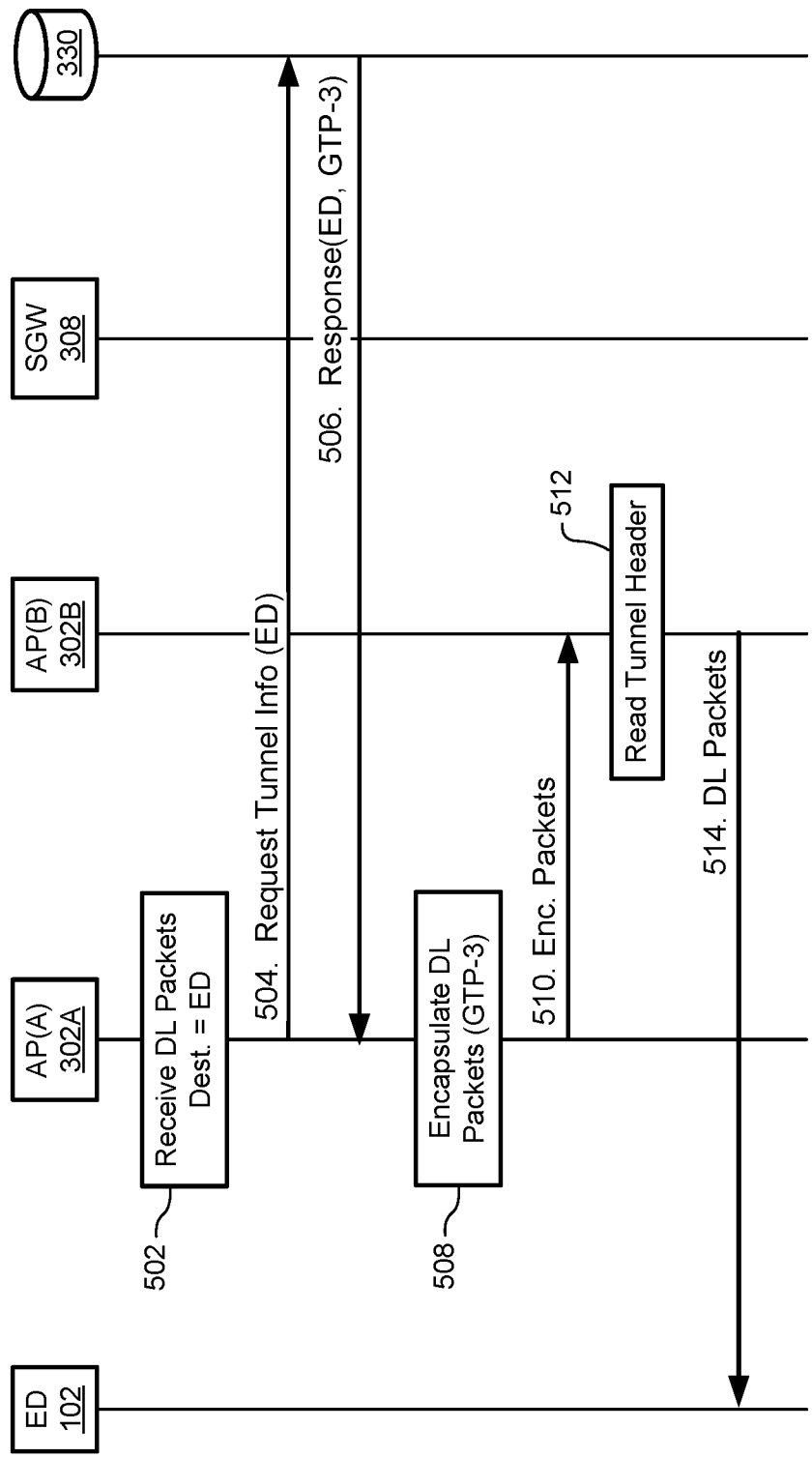
FIG. 5 is a message flow diagram illustrating an example method in accordance with embodiments of the present invention implemented in the network of FIGS. 3A and 3B.

Referring to FIG. 5, in accordance with the present invention, when the initial AP 302A receives late-arriving DL packets destined for the ED 102 (at 502), the initial AP 302A may access the central repository 330 to obtain the (new) tunnel information associated with the ED 102. For example, the initial AP 302A may send a Request message (at 504) with the device identifier of the ED 102 to the central repository 330. Following receipt of the look-up request message, the central repository 330 may extract the device identifier from the request and use it to locate the tunnel information that pertains to the ED 102 (which in this case will relate to GTP-3 340 established between the SGW 308 and the new AP 302B). The central repository 330 may then send a response message (at 506) containing the tunnel information to the initial AP 302A.

Alternatively, the initial AP 302A may subscribe with the central repository 330 to receive tunnel information updates pertaining to the ED 102. In some embodiments, the initial AP 302A may subscribe with the central repository 330 when it first provides its tunnel information pertaining to the ED to the central repository 330 (e.g. at step 412). In other embodiments, the initial AP 302A may subscribe with the central repository 330 at some later time, for example following receipt of the Hand-Over request message from the new AP 302B (at step 414). Similarly, the new AP 302B may subscribe with the central repository 330 when it first provides its tunnel information pertaining to the ED to the central repository 330 (e.g. at step 420), or at some later time.

Following receipt of the response message from the central repository 330, the initial AP 302A may encapsulate the DL packets (at 508) with a tunnel header containing the tunnel information received from the central repository 330. In embodiments in which the initial AP 302A receives tunnel information updates pertaining to the ED 102 from the central repository 330, the steps of sending a Request message (at 504) with the device identifier of the ED 102 to the central repository 330 and receiving (at 506) a response message from the central repository 330 are omitted, and (after receiving the updated tunnel information from the central repository) the initial AP 302A may proceed directly to encapsulate the DL packets (at 508) with a tunnel header containing the updated tunnel information. The initial AP 302A may then send the encapsulated DL packets (at 510) to the new AP 302B. Since the updated tunnel information obtained by the initial AP 302A from the central repository 330 already contains the address of the new AP 302B as the destination address, it is not necessary to establish a temporary tunnel between the initial AP 302A and the new AP 302B to convey late-arriving DL packets to the new AP 302B.

The encapsulated DL packets sent to the new AP 302B by the initial AP 302A (at 510) will contain at least the destination address and port and source TEID associated with the new tunnel GTP-3 340, and so are effectively indistinguishable from encapsulated DL packets sent through the tunnel GTP-3 340 to the new AP 302B by the SGW 308. Accordingly, when the new AP 302B receives the encapsulated DL packets from the initial AP 302A, the new AP 302B can read the tunnel header (at 512), and compare the tunnel header information from the received packets to its own information pertaining to GTP-3 340. Based on this comparison, the new AP 302B will determine that the received encapsulated DL packets match those sent by the SGW 308, and so proceed to process the DL packets in a corresponding manner. Thus the new AP 302B will forward (at 514) the DL packets to the ED 102 through its link 306B.

It is important to note that the tunnel GTP-3 340 may have been established (following conventional techniques) as a "one-to-one" tunnel between the SGW 308 and the new AP 302B. However, the present invention enables GTP-3 340 to be used as a "many-to-one" tunnel, in which packets may be forwarded to the new AP 302B from (possibly) many different nodes in the network 300, and will be treated by the AP 302B as if those packets had been sent via GTP-3 340 from the SGW 308.

An advantage of the present invention is that, once a GTP tunnel between two endpoint nodes has been established (in a conventional manner, for example), the tunnel information can be used by other nodes in the network to send packets to one of the endpoint nodes, and can be treated by the receiving endpoint node as if those packets had been sent through the tunnel from the other endpoint node. This avoids the need to establish new connections or tunnels to one of the endpoint nodes. For example, in the scenario described above, the initial AP 302A may send the encapsulated DL packets to the new AP 302B, which will treat those packets as if they had been received from the SGW 308. This operation exploits the existing tunnel GTP-3 340 between the new AP 302B and the SGW 308, and so avoids the need to establish a new tunnel between the initial AP 302A and the new AP 302B.

Based on the foregoing description, it may be appreciated that the SGW 308 is no longer used to route all traffic destined for the ED 102, but rather is used primarily as an endpoint to support the initial establishment of a tunnel (such as GTP-1 324) to the particular AP 302 through which the ED 102 may be reached. Once the tunnel has been established and its associated tunnel information exposed to the network (e.g. via the central repository 330) other nodes may send packets to the ED using the tunnel information, without further involvement of the SGW 308. In such cases, the SGW 308 may be replaced by a router in the network, and the administration services conventionally performed by a Serving Gateway (SGW) relocated to other nodes in the network (such as the AP 302 hosting the ED 102). By this means, the present invention provides a migration path towards a so-called "anchorless" network, in which traffic may be routed through the Core Network 304 between the Data Network 322 and an AP 302 hosting a particular ED 102, without the involvement of an anchor node to maintain continuity of device administration as the ED 102 moves from the coverage area of one AP 302 to the coverage area of another AP.

Figure 6:
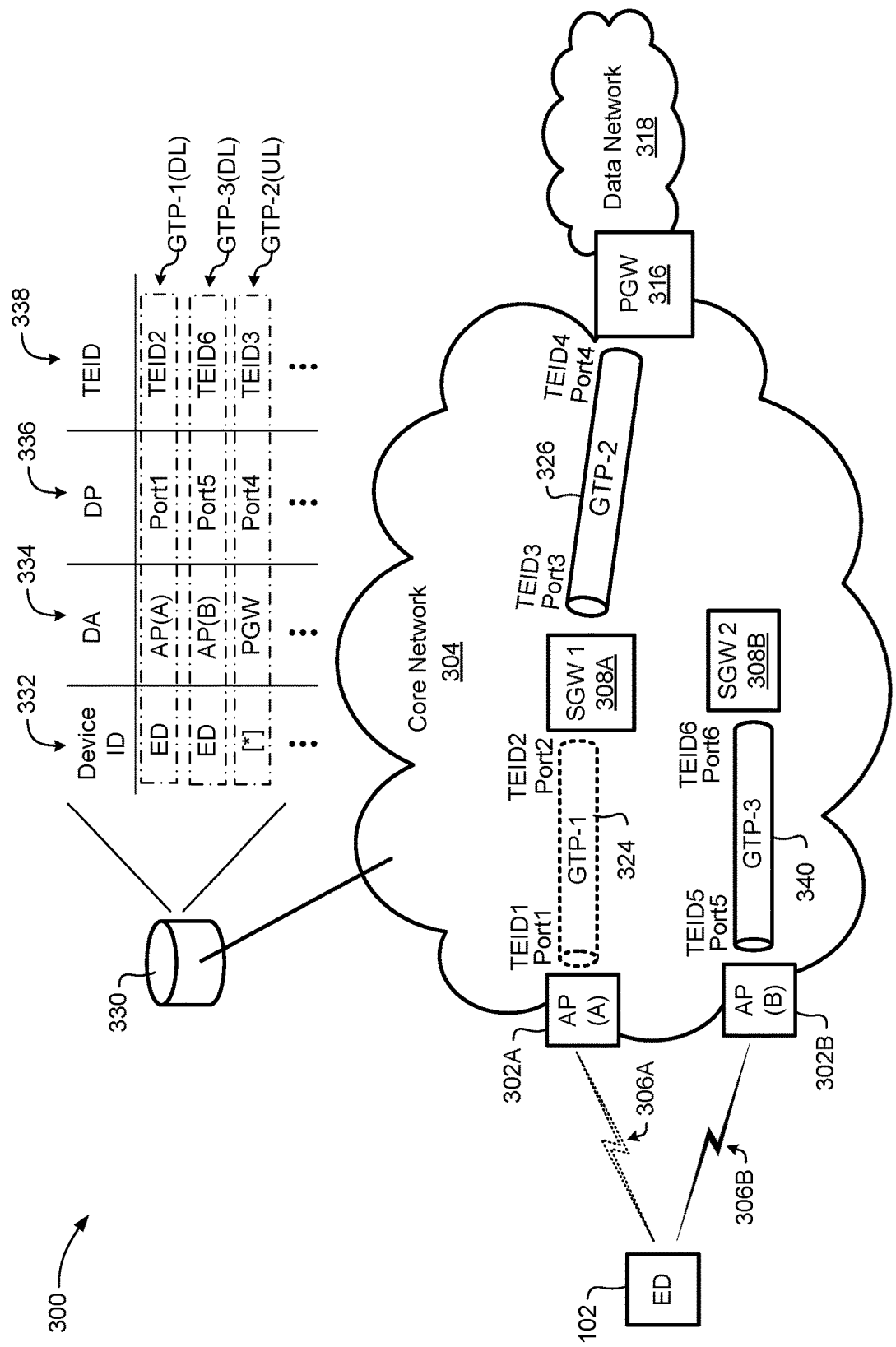
FIG. 6 is a block diagram illustrating elements of another mobile network in which embodiments of the present invention may be deployed.

In the embodiments of FIGS. 3A-3C, the initial and new access points 302A and 302B are connected to a common Serving Gateway SGW 308 via respective GTP tunnels GTP-1 324 and GTP-3 340. FIG. 6 illustrates an embodiment in which the initial and new access points 302A and 302B are connected to respective different Serving Gateways SGW1 308A and SGW2 308B. As may be seen in FIG. 7, DownLink packets destined for the ED 102 that arrive at the initial Serving Gateway SGW1 308A after the initial tunnel GTP-1 324 has been released can be forwarded to the ED 102 using a method that is directly analogous to that described above with reference to FIG. 5.

Figure 7:
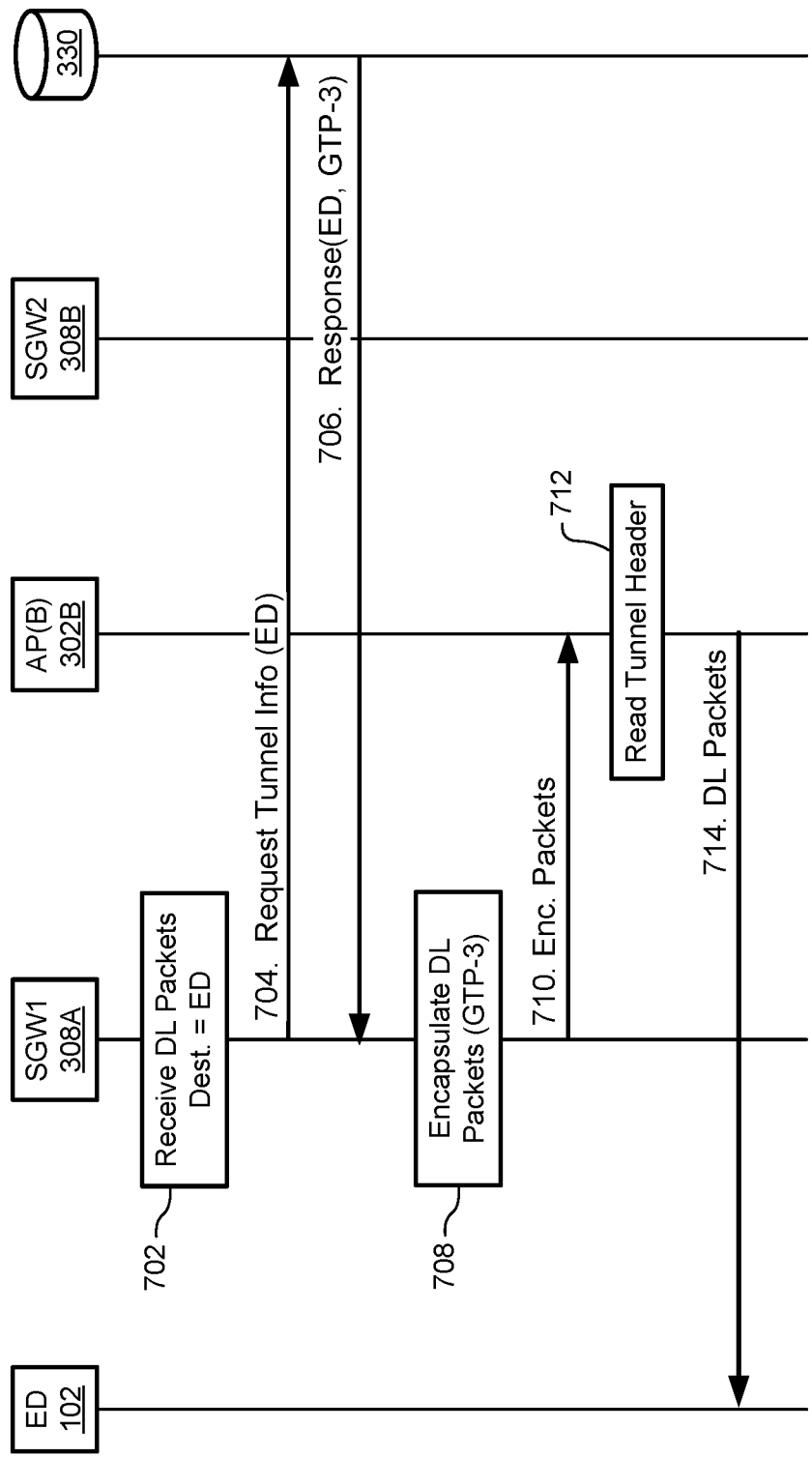
FIG. 7 is a message flow diagram illustrating an example method in accordance with embodiments of the present invention implemented in the network of FIG. 6.

Referring to FIG. 7, when the initial Serving Gateway SGW1 308A receives DL packets destined for the ED 102 (at 702), SGW1 308A may access the central repository 330 to obtain the (new) tunnel information associated with the ED 102. For example, the SGW1 308A may send a Request message (at 704) with the device identifier of ED 102 to the central repository 330. Following receipt of the look-up request message, the central repository 330 may extract the device identifier from the request and use it to locate the tunnel information that pertains to the ED 102 (which in this case will relate to the new tunnel GTP-3 340). The central repository 330 may then send a response message (at 706) containing the tunnel information pertaining to GTP-3 340 to SGW1 308A.

Alternatively, the initial SGW1 308A may subscribe with the central repository 330 to receive tunnel information updates pertaining to the ED 102. In some embodiments, the initial SGW1 308A may subscribe with the central repository 330 when the initial tunnel GTP tunnels GTP-1 324 is established (e.g. at step 408). In other embodiments, the initial SGW1 308A may subscribe with the central repository 330 at some later time, for example during the re-routing of traffic flows (at step 422). Similarly, the new SGW2 308B may subscribe with the central repository 330 during establishment of new connections (e.g. at step 418), or at some later time Following receipt of the response message from the central repository 330, SGW1 308A may encapsulate the DL packets (at 708) with a tunnel header containing the tunnel information received from the central repository 330. In embodiments in which the initial SGW1 308A receives tunnel information updates pertaining to the ED 102 from the central repository 330, the steps of sending a Request message (at 704) with the device identifier of the ED 102 to the central repository 330 and receiving (at 706) a response message from the central repository 330 are omitted, and the initial SGW1 308A may (after receiving the updated tunnel information from the central repository) proceed directly to encapsulate the DL packets (at 708) with a tunnel header containing the updated tunnel information. The SGW1 308A may then send the encapsulated DL packets (at 710) to the new AP 302B. Since the updated tunnel information obtained by the initial SGW1 308A from the central repository 330 already contains the address of the new AP 302B as the destination address, it is not necessary for the initial SGW1 308A to send the encapsulated DL packets (at 7510) to the new AP 302B via either the new SGW2 308B or the PGW 320.

The encapsulated DL packets sent to the new AP 302B by the initial Serving Gateway SGW1 308A (at 710) are effectively indistinguishable from encapsulated DL packets sent to the new AP 302B by the new Serving Gateway SGW2 308B. Accordingly, when the new AP 302B receives the encapsulated DL packets from SGW1 308A, the new AP 302B can read the tunnel header (at 712), and compare the tunnel header information in the received packets to its own information pertaining to the tunnel GTP-3 340. Based on this comparison, the new AP 302B will determine that the received encapsulated DL packets match those sent by the SGW2 308B, and proceed to process the DL packets in a corresponding manner. Consequently, the new AP 302B will forward (at 714) the DL packets to the ED 102 through its link 306B.

The description above focusses on DownLink traffic destined for an ED 102. However, it will be appreciated that directly analogous methods may be implemented for UpLink traffic destined for an Application Server in the Data Network 318, for example. For example, FIG. 6 shows an embodiment in which tunnel information pertaining to the uni-directional tunnel GTP-2(UL) 326A is exposed via an entry in the central repository 330. In the example of FIG. 6, the Device ID 332 for this entry is a Wildcard value (=[*]), meaning that all UpLink packets destined for an address accessible through the PGW 316 may be forwarded to the PGW 316 using that tunnel information. In this case, when an SGW 308 receives a UL packet destined for an address accessible through the PGW 316, it may forward that packet to the PGW 316 via an already established tunnel, or, alternatively, it may use the tunnel information obtained from the central repository 330 to forward the packet (encapsulated with a suitable tunnel header) to the PGW 316, which will treat the packet as if it had been transmitted through the tunnel GTP-2(UL) 326A from SGW-1 308A. Furthermore, when an AP 302 receives a UL packet destined for an address accessible through the PGW 316, it may forward that packet to the PGW 316 via an SGW as described above, or, alternatively, it may use the tunnel information obtained from the central repository 330 to forward the packet (encapsulated with a suitable tunnel header) to the PGW 316 directly, and so bypassing any SGWs in the network 304.

In such cases, the SGW 308 and PGW 316 serve primarily to provide end-points for establishing of tunnels that enable traffic forwarding from (potentially) many different nodes in the network 304, and so may be replaced by suitable routers. The administration services conventionally performed by a Serving Gateway (SGW) and the PDN Gateway (PGW) can be relocated to other nodes in the network (such as the AP 302 hosting the ED 102), which provides a migration path towards a so-called "anchorless" network, as discussed above.

As noted above, FIG. 4 illustrates an example Hand-Over process 402 that may be executed in response to the ED 102 moving from the coverage area of the initial AP(A) 302A and into the coverage area of a new AP(B) 302B. Following receipt of the Hand-Over request, the AMF/MME 316 may interact with the ED 102, the involved access points 302A and 302B and the SGW 308 to trigger establishment (at 418) of new connections with the new access point 302B. These new connections may include new GTP tunnel (GTP-3) 340 between the SGW 308 and the new AP 302B. Once the new GTP tunnel GTP-3 340 has been set up, either or both of the SGW 308 and the new Access Point 302B may send (at 420) tunnel information pertaining to GTP-3 340 to the central repository 330. The AMF/MME 316 may further interact with the ED 102, the involved access points 302A and 302B and the SGW 308 to reroute traffic (at 422) to the ED 102 via the new tunnel GTP-3 340 and the new access point 302B.

In some embodiments, rerouting traffic to the ED 102 via the new tunnel GTP-3 340 and the new access point AP(B) 302B, may require installing context information associated with the ED 102 in the new access point AP(B) 302B. Such context information may, for example, include device administration information for traffic monitoring and statistics, policy enforcement, and billing. If desired, the context information may be sent to the new access point AP(B) 302B by either the initial AP(A) 302(A) or SGW 302 via the new GTP tunnel GTP-3 340, by encapsulating the context information with a tunnel header 328 containing the tunnel information pertaining to GTP-3 340 obtained from the central repository 330, as described above with reference to FIGS. 5 and 7.

Figure 8:
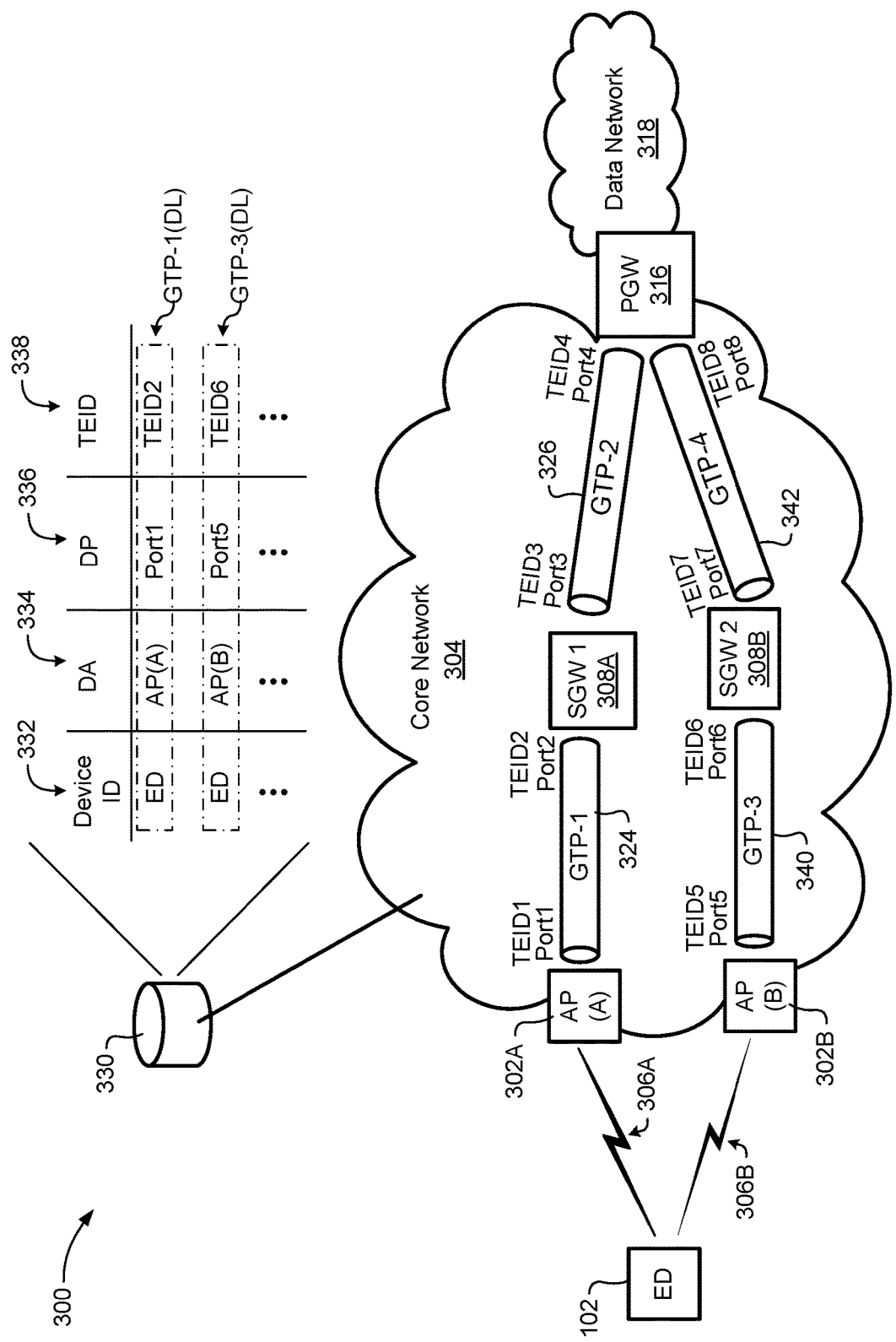
FIG. 8 is a block diagram illustrating elements of another mobile network in which embodiments of the present invention may be deployed.

FIG. 8 illustrates an embodiment in which the ED 102 is connected to the network via two links 306A and 306B, each of which terminates on a respective different access point AP(A) 302A and AP(B) 302B. In the illustrated embodiment, each access point AP(A) 302A and AP(B) 302B is connected to a respective different serving gateway SGW1 308A and SGW2 308B. In other embodiments, the access points AP(A) 302A and AP(B) 302B may be connected to a common serving gateway SGW 308.

Figure 9:
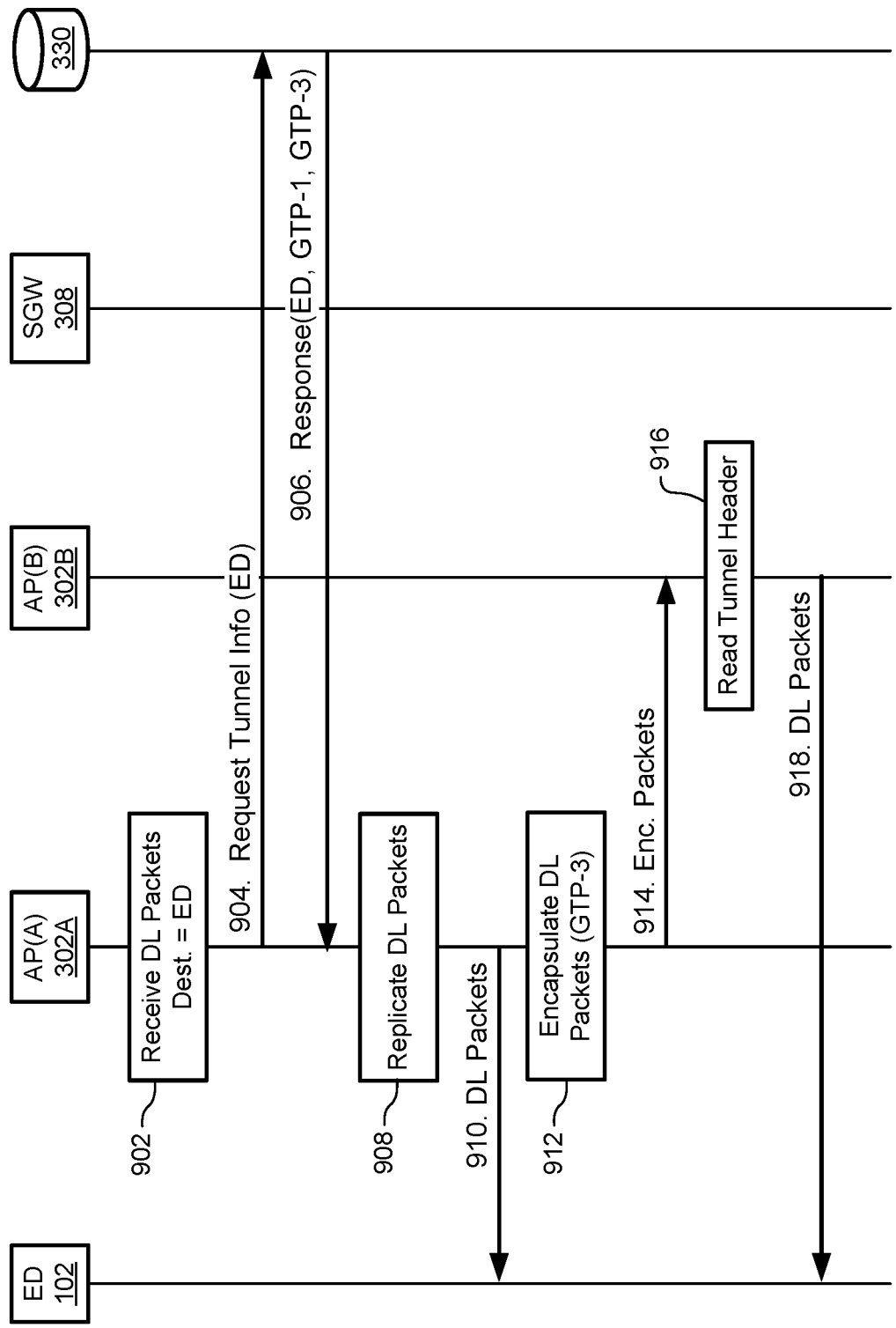
FIG. 9 is a message flow diagram illustrating an example method in accordance with embodiments of the present invention implemented in the network of FIG. 8.

In some embodiments, it may be desirable to route all DL packets destined for the ED 102 through both of the links 306A and 306B. This requires replication of the DL packets, and the forwarding of each stream of DL packets through a respective one of the two links 306A and 306B. FIG. 9 is a message flow diagram illustrating an example method of performing this operation in accordance with the present invention.

Referring to FIG. 9, in accordance with the present invention, when an access point (such as, for example AP 302A) receives DL packets destined for the ED 102 (at 902), the receiving AP(A) 302A may access the central repository 330 to obtain the tunnel information associated with the ED 102. For example, AP(A) 302A may send a Request message (at 904) with the device identifier of the ED 102 to the central repository 330. Following receipt of the look-up request message, the central repository 330 may extract the device identifier from the request and use it to locate the tunnel information that pertains to the ED 102 (which in this case will relate to GTP-1 324 and GTP-3 340). The central repository 330 may then send a response message (at 906) containing the tunnel information to the initial AP(A) 302A. As described above, in an alternative embodiment, AP(A) 302A may automatically receive updated tunnel information pertaining to the ED 102 from the central repository 330, in which case the request message (at 904) and Response message (at 906) would be omitted.

Following receipt of the response message from the central repository 330, AP(A) 302A may recognise that the tunnel information relating to GTP-1 324 is associated with itself, and therefore requires no further action. On the other hand, AP(A) 302A may recognise that the tunnel information relating to GTP-3 340 is associated with AP(B) 302B. Accordingly, AP(A) 302A may replicate the DL packets (at 908), before sending one copy of the DL packets to the ED 102 (at 910) via its local link 306A, and encapsulating the other copy of the DL packets (at 912) with a tunnel header containing the tunnel information associated with GTP-3. AP(A) 302A may then send the encapsulated DL packets (at 914) to AP(B) 302B.

The encapsulated DL packets sent to AP(B) 302B by the AP(A) 302A (at 914) are effectively indistinguishable from encapsulated DL packets sent to AP(B) 302B by the SGW2 308B. Accordingly, when AP(B) 302B receives the encapsulated DL packets from AP(A) 302A, AP(B) 302B can read the tunnel header (at 916), and compare the tunnel header information from the received packets to its own information pertaining to GTP-3 340. Based on this comparison, AP(B) 302B will determine that the received encapsulated DL packets match those sent by the SGW2 308B, and proceed to process the DL packets in a corresponding manner. Thus AP(B) 302B will forward (at 918) the DL packets to the ED 102 through its link 306B.

As may be appreciated, the method described above with reference to FIGS. 8 and 9 may also be used to divide a traffic flow between the two links 306A and 306B. For example, rather than replicate all DL packets destined for the ED 102, AP(A) 302A may separate an inbound flow of DL packets, so that some defined proportion of the DL packets are forwarded to the ED 102 via Link 306A, while the remaining DL packets are forwarded to the ED 102 via Link 306B. Example scenarios may include:

sending even-numbered DL packets to the ED 102 via Link 306A and sending odd-numbered DL packets to the ED 102 via Link 306B; and sending all DL packets to the ED 102 via Link 306A, up to a predetermined maximum bandwidth, and then sending excess DL packets to the ED 102 via Link 306B.

The embodiments described above with reference to FIGS. 8 and 9 implement packet duplication for routing packets to a specific ED 102 via a pair of Access Points (302A and 302B). It will be appreciated that the same method may be used to implement packet duplication for other purposes. For example, in a lawful intercept scenario, a law enforcement agency may require packet flows to and from a particular ED 102 to be duplicated, and the duplicates sent to a predetermined node in the network. In such a scenario, tunnel information associated with the Law Enforcement node can be forwarded to (and recorded by) the central repository 330, and may include a device identifier 332 of the particular ED 102, a destination Address 334 and Destination port 336 of the Law Enforcement node, and a source TEID 336 having either a wildcard value or a value allocated by an endpoint node associated with the Law Enforcement node.

In embodiments in which a node sends a request message (e.g. at 904) to the central repository 330 to obtain tunnel information pertaining to the particular ED, the central repository 330 will include the tunnel information for the Law Enforcement node in the response message (e.g. at 906). In embodiments in which a node may subscribe with the central repository 330 to obtain updated tunnel information pertaining to the particular ED, the tunnel information for the Law Enforcement node will be automatically forwarded to the node. In either case, the node will respond by replicating DL packets destined for the ED (e.g. at 908), encapsulating the replicated packets (e.g. at 912) with a tunnel header containing the tunnel information for the Law Enforcement node, and forwarding the encapsulated packets to the law enforcement node (e.g. at 914). It will be appreciated that directly analogous methods may be used to direct (replicated) Uplink traffic sent from the particular ED to the law enforcement node.

Figure 10:
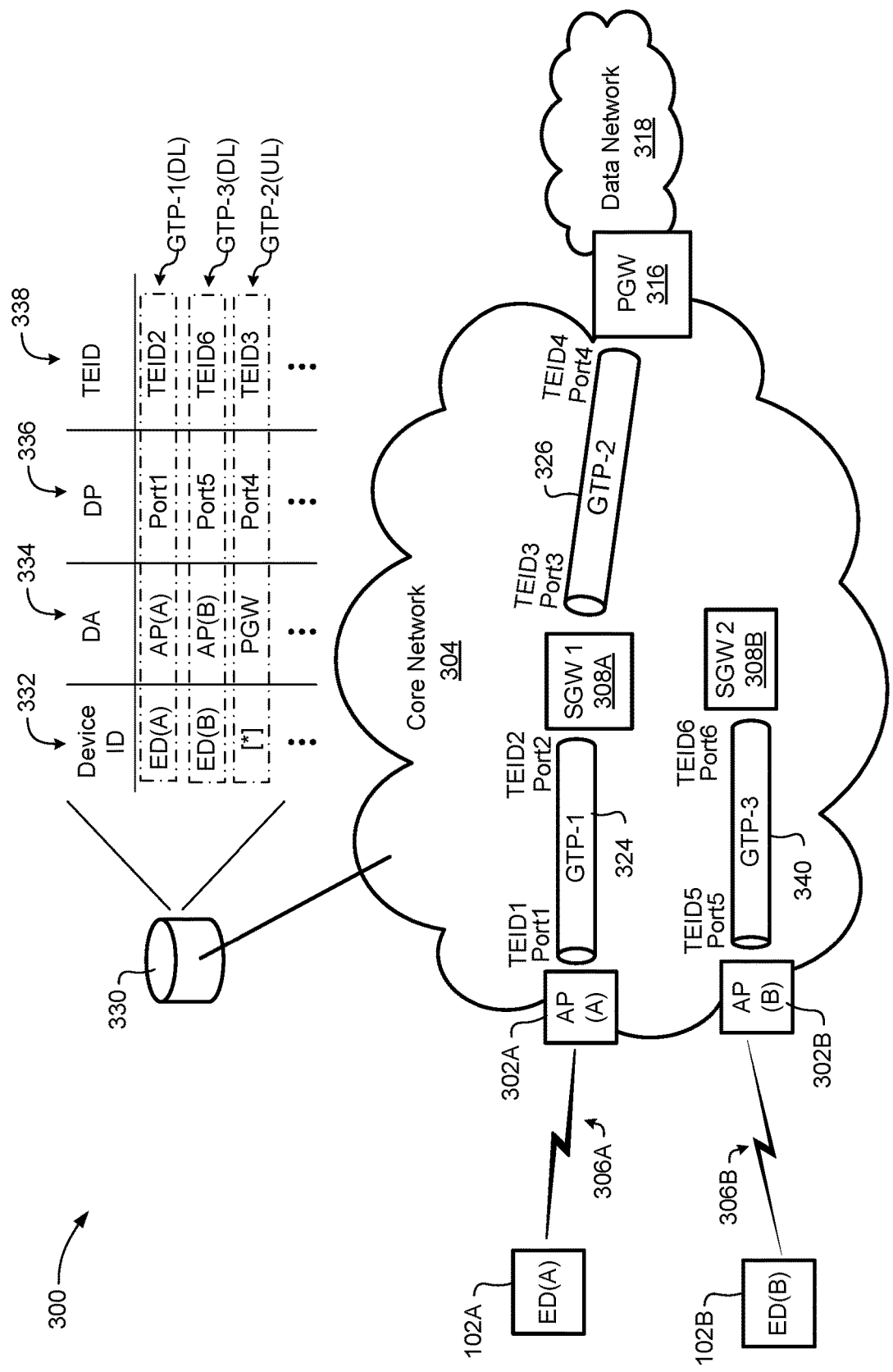
FIG. 10 is a block diagram illustrating elements of another mobile network in which embodiments of the present invention may be deployed.

The embodiments described above relate to scenarios in which an ED 102 establishes a connection to an initial AP 302A, and subsequently moves to the coverage area of a new AP 302B. FIG. 10 illustrates an embodiment in which a pair of EDs (e.g. ED(A) 102A and ED(B) 102B) are connected to respective different access points 302A and 302B, and messages are exchanged between the two EDs. As may be seen in FIG. 11, packets transmitted by ED(A) 102A can be forwarded to ED(B) 102B using a method that is directly analogous to those described above.

Figure 11:
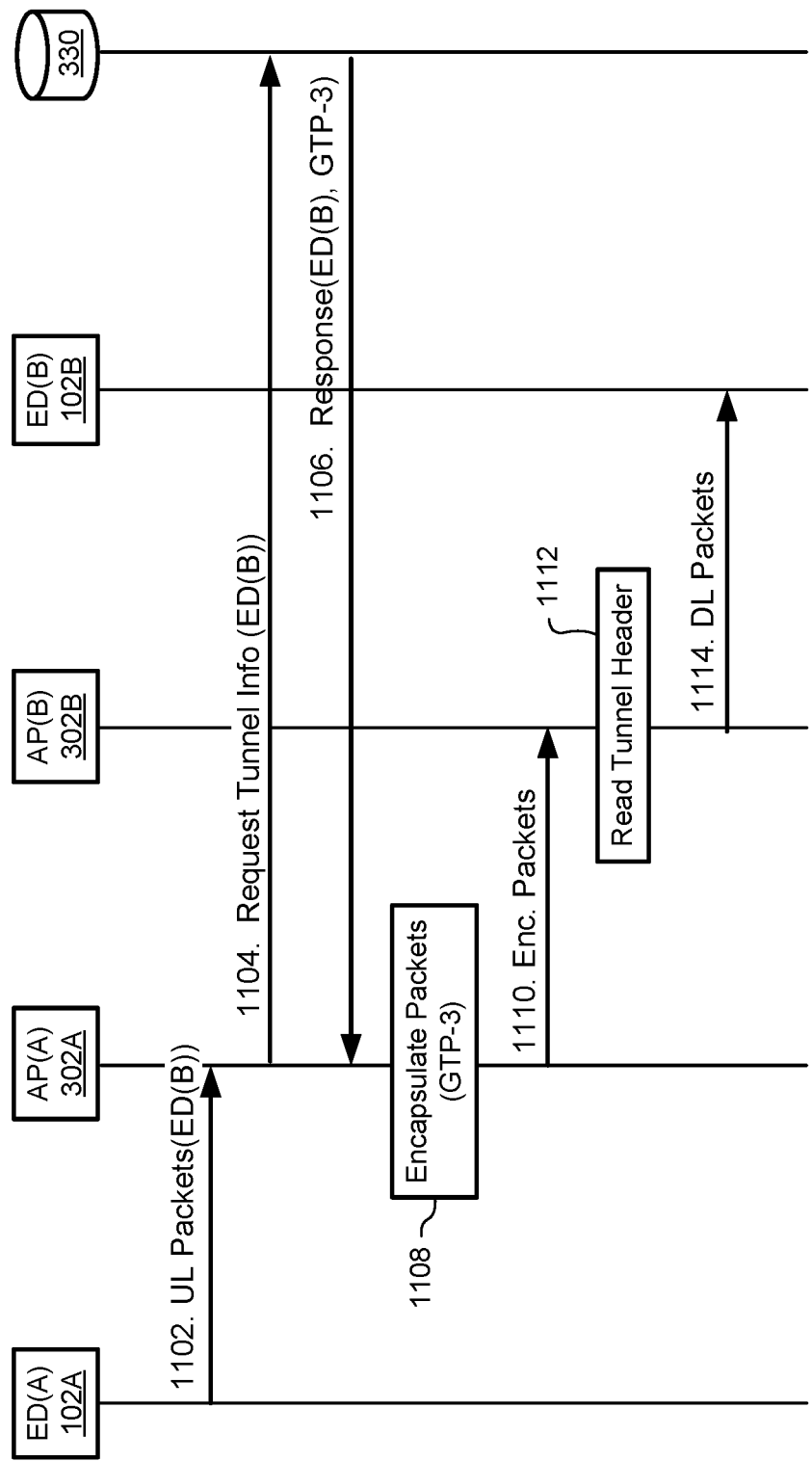
FIG. 11 is a message flow diagram illustrating an example method in accordance with embodiments of the present invention implemented in the network of FIG. 10.

Referring to FIG. 11, when AP(A) 302A receives packets from ED(A) 102A (at 1102) that are destined for the ED(B) 102B, AP(A) 302A may access the central repository 330 to obtain the tunnel information associated with the ED(B) 102B. For example, the AP(A) 302A may send a Request message (at 1104) with the device identifier of ED(B) 102B to the central repository 330. Following receipt of the look-up request message, the central repository 330 may extract the device identifier from the request and use it to locate the tunnel information that pertains to the ED(B) 102B (which in this case will relate to the tunnel GTP-3 340). The central repository 330 may then send a response message (at 1106) containing the tunnel information pertaining to GTP-3 340 to AP(A) 302A. As may be seen in FIG. 10, this tunnel information will include: the Destination Address 334 (=AP(B)) and Destination Port 336 (=Port 5) assigned by the AP(B) 302B, and the TEID 338 (=TEID 6) assigned by the SGW2 308B during establishment of the tunnel GTP-3 340.

Following receipt of the response message from the central repository 330, AP(A) 302A may encapsulate the packets (at 1108) with a tunnel header 328 containing the tunnel information received from the central repository 330. The AP(A) 302A may then send the encapsulated packets (at 1110) to the AP(B) 302B. Since the tunnel information obtained by the AP(A) 302A from the central repository 330 already contains the address of the AP(B) 302B as the destination address, it is not necessary for the AP(A) 302A to send the encapsulated UL packets (at 1110) to the AP(B) 302B via either of the Serving Gateways SGW1 308A or SGW2 308B.

The encapsulated packets sent to AP(B) 302B by the AP(A) 302A (at 1110) are effectively indistinguishable from encapsulated DL packets sent to the AP(B) 302B by the SGW2 308B. Accordingly, when the AP(B) 302B receives the encapsulated UL packets from AP(A) 302A, the AP(B)

302B can read the tunnel header (at 1112), and compare the tunnel header information in the received packets to its own information pertaining to the tunnel GTP-3 340. Based on this comparison, AP(B) 302B will determine that the received encapsulated packets match DL packets sent by the SGW2 308B, and proceed to process the received packets in a corresponding manner. Consequently, AP(B) 302B will forward (at 1114) the packets to the ED(B) 102B through its link 306B.

In the foregoing description, embodiments of the invention are described by way of example embodiments that exploit features of GTP tunnels between nodes of the core network 304. One such feature of GTP tunnels is that the receiving node does not positively verify the sending node of received packets. Thus, for example, if a node receives a packet encapsulated with a tunnel header 328 that contains the correct Destination address 334, Destination Port number 336 and Source TEID 338, then the receiving node will accept the received packet as having been sent through the tunnel, and process the received packet accordingly. Other tunneling protocols have other features, some of which may include more rigorous validation of the source node of received packets. In all cases, however, there will be a combination of header fields and field content values that will cause the receiving node to accept the received packet as having been sent through the tunnel. It is contemplated that the specific tunnel information fields exposed to other nodes in the network (e.g. through the central repository 330) will be varied as needed such that a requesting node can obtain the tunnel information needed to send packets to a receiving node that will accept the received packet as having been sent through the tunnel.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method in a mobile network, the method comprising:
    exposing tunnel information identifying a point-to-point tunnel between a first endpoint node and a second endpoint node, such that at least one other node in the mobile network can access the exposed tunnel information; and
    transmitting configuration information to a third node of the network to allow the third node to encapsulate a packet with a tunnel header using the exposed tunnel information, such that the first endpoint node will accept the encapsulated packet as having been sent by the second endpoint node through the point-to-point tunnel, the third node being one of an access point and a gateway.

2. The method as claimed in claim 1, wherein the point-to-point tunnel comprises a GPRS Tunnel Protocol (GTP) tunnel.

3. The method as claimed in claim 1, wherein the first node is either one of:
    an Access Point (AP) of the mobile network, the AP being connected to an electronic device; and
    a gateway between the mobile network and a data network.

4. The method as claimed in claim 3, wherein the second node is either one of:
    a Serving Gateway (SGVV) of the mobile network; and
    a router of the mobile network.

5. The method as claimed in claim 3, wherein the packet is destined for the electronic device.

6. The method as claimed in claim 3, wherein the packet is destined for an application server in the data network.

7. The method as claimed in claim 3, wherein the tunnel information identifying the point-to-point tunnel comprises:
    an address of the first endpoint node;
    a port number of the point-to-point tunnel at the first endpoint node; and
    a Tunnel Endpoint Identifier (TEID) of the point-to-point tunnel assigned by the second endpoint node.

8. The method as claimed in claim 1, wherein accessing tunnel information identifying the point-to-point tunnel comprises:
    sending, by the third node, a request message to a central repository of the mobile network, the central repository storing the tunnel information; and
    receiving, by the third node, a response message containing the tunnel information from the central repository.

9. The method as claimed in claim 1, wherein accessing tunnel information identifying the point-to-point tunnel comprises:
    subscribing, by the third node, with a central repository of the mobile network for updates pertaining to the point-to-point tunnel, the central repository storing the tunnel information; and
    subsequently receiving, by the third node, an update message from the central repository, the update message including the tunnel information.

10. A method in a mobile network including a first endpoint node configured to receive packets through a point-to-point tunnel from a second endpoint node, the method comprising:
    accessing, by a third node, tunnel information identifying the point-to-point tunnel, the third node being an access point or a gateway;
    encapsulating, by the third node, a packet using a tunnel header containing the accessed tunnel information, the tunnel header matching a header of packets sent by the second endpoint node through the point-to-point tunnel to the endpoint first node, such that the first endpoint node will accept the encapsulated packet as having been sent by the second endpoint node through the point-to-point tunnel; and
    sending, by the third node, the encapsulated packet to the first endpoint node.

11. The method of claim 10 wherein the third node is an access point and is one of an eNodeB and a gNodeB.

12. The method of claim 10 wherein the third node is a gateway and is one of a serving gateway or a PDN gateway.

13. A node configured for use in a mobile network, the node comprising:
    at least one processor; and
    software instructions stored on a non-transitory computer readable storage medium, the software instructions configured to control the at least one processor to perform steps of:
        accessing tunnel information identifying a point-to-point tunnel between first and second endpoint nodes of the network, wherein the node and each of the first and second endpoint nodes are respective different nodes of the network;
        encapsulating a packet using a tunnel header containing the accessed tunnel information, the tunnel header matching a header of packets sent by the second endpoint node through the point-to-point tunnel to the first endpoint node, such that the first endpoint node will accept the encapsulated packet as having been sent by the second endpoint node through the point-to-point tunnel; and sending the encapsulated packet to the first endpoint node;

wherein the node is an access point or a gateway.

14. The node as claimed in claim 13, wherein the point-to-point tunnel comprises a GPRS Tunnel Protocol (GTP) tunnel.

15. The node as claimed in claim 13, wherein:

the first endpoint node is either one of:

an Access Point (AP) of the mobile network, the packet being destined for an electronic device connected to the AP; and a gateway between the mobile network and a data network, the packet being destined for an application server in the data network.

16. The node as claimed in claim 13, wherein accessing tunnel information identifying the point-to-point tunnel comprises:

sending, by the node, a request message to a central repository of the mobile network, the central repository storing the tunnel information; and receiving, by the node, a response message containing the tunnel information from the central repository.

17. The node as claimed in claim 13, wherein accessing tunnel information identifying the point-to-point tunnel comprises:

subscribing, by the node, with a central repository of the mobile network for updates pertaining to the point-to-point tunnel, the central repository storing the tunnel information; and subsequently receiving, by the node, an update message from the central repository, the update message including the tunnel information.

18. The node as claimed in claim 13, wherein the tunnel information identifying the point-to-point tunnel comprises:

an address of the first endpoint node;

a port number of the point-to-point tunnel at the first endpoint node; and a Tunnel Endpoint Identifier (TEID) of the point-to-point tunnel assigned by the second endpoint node.

\* \* \* \* \*